(12) United States Patent
Jiang et al.

(10) Patent No.: US 6,391,433 B2
(45) Date of Patent: *May 21, 2002

(54) COATING COMPOSITION AND THIN FILM LAYER FOR OPTICAL PARTS

(75) Inventors: Jian Jiang; Hiroshi Ohta, both of Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/758,433

(22) Filed: Jan. 12, 2001

Related U.S. Application Data

(63) Continuation of application No. 09/327,072, filed on Jun. 7, 1999, now Pat. No. 6,248,631.

(30) Foreign Application Priority Data

Jun. 12, 1998 (JP) .......................................... 10-165294

(51) Int. Cl.⁷ .............................. B32B 9/04; C09D 5/00
(52) U.S. Cl. ........................ 428/220; 428/336; 351/166; 427/164; 427/372.2; 427/384
(58) Field of Search ................................ 428/220, 336; 351/166; 427/164, 372.2, 384

(56) References Cited

U.S. PATENT DOCUMENTS 5,789,476 A  8/1998  Iryo et al. .................. 524/430
5,834,621 A  11/1998 Yamamoto et al. ......... 560/221
6,179,931 B1 * 1/2001 Kobayashi et al. ........... 134/38

FOREIGN PATENT DOCUMENTS

| | | |
|---|---|---|
| EP | 525215 A2 | 2/1993 |
| EP | 562966 A2 | 9/1993 |
| EP | 578220 A2 | 1/1994 |
| EP | 742244 A2 | 11/1996 |
| EP | 803504 A2 | 10/1997 |
| EP | 99 11 1378 | 9/1999 |
| JP | 63-141001 | 6/1988 |
| JP | 5-194486 | 8/1993 |
| JP | 6-87189 | 3/1994 |
| JP | 7-118263 | 9/1995 |
| JP | 9-59248 | 3/1997 |
| JP | 9-80206 | 3/1997 |
| JP | 9-118870 | 5/1997 |
| JP | 9-125003 | 5/1997 |
| JP | 9-291227 | 11/1997 |
| JP | 10007756 | 1/1998 |

* cited by examiner

Primary Examiner—Shrive P. Beck
Assistant Examiner—Elena Tsoy
(74) Attorney, Agent, or Firm—Morrison & Foerster LLP

(57) ABSTRACT

The present invention provides optical parts having good impact resistance, good adhesiveness between the substrate and a thin film layer coating formed thereon, good scratch resistance and good antireflection capabilities. The thin film layer coating composition comprises (1) a dithian ring containing sulfur compound and/or a benzene ring containing sulfur compound, and (2) a polyfunctional thiol compound.

13 Claims, No Drawings

COATING COMPOSITION AND THIN FILM LAYER FOR OPTICAL PARTS

This application is a continuation of Ser. No. 09/327,072, filed Jun. 7, 1999, now U.S. Pat. No. 6,248,631.

This application is based on Japanese Laid-Open Patent Application No. 2000-002801, filed Jun. 12, 1998, and published Jan. 7, 2000, the entire contents of which are incorporated by reference.

FIELD OF THE INVENTION

The invention relates to a coating composition for optical parts, a thin film layer made of the coating composition and an optical part. In particular, it relates to a coating composition favorable for obtaining optical parts having good impact resistance, good adhesion between the substrate and the thin film layer, good scratch resistance and good antireflection capabilities, and also to a thin film layer made of the coating composition and an optical part including the coating composition.

BACKGROUND OF THE INVENTION

Recently, plastic materials have been used for optical parts in place of inorganic glass, especially for eyeglass lenses, because they are lightweight and have good dyeability and good impact resistance. In particular, a diethylene glycol bisallylcarbonate polymer (hereinafter referred to as CR-39) has been used, primarily for plastic lenses. However, it has a refractive index of 1.50, which is lower than that of inorganic glass. Although lenses made of CR-39 have relatively strong power, they are thick and do not generally have a good appearance. Various types of high-refractive-index, low-chromatic-aberration plastic lenses have also been tried, but they are also not free from problems.

Ordinary plastic lenses are poor in scratch resistance. It has been known to provide a silicone-based, hard coat layer on the substrate surface of plastic lenses to improve scratch resistance. In addition, the hard coat layer can be overcoated with an inorganic antireflection layer. The reflection layer can be applied, for example, by vacuum vapor deposition. The added antireflection layer provides the additional benefit of reducing surface reflection that could cause image flickering. In addition, an outer layer can be provided to protect the inner layers from aging. A problem that occurs, however, in forming both a hard coat layer and an antireflection layer on the surface of a plastic substrate is that the impact resistance of the lenses is low.

One means for improving the impact resistance of lenses comprising a low-refractive-index substrate, such as CR-39, is to form a thermosetting or thermoplastic resin layer between the substrate and the hard coat layer (JP-A-63-87223, JP-A-63-141001). However, lenses which have a high-refractive-index substrate, such as polythiourethane, and a resin layer, will exhibit interfacial light interference due to the difference in refractive index between the substrate and the hard coat layer. The result will be diminished optical quality, as well as inferior appearance. For lenses of that type, a technique of forming a primer layer of a thermosetting or thermoplastic resin that contains particles of dispersed metal oxide has been used (JP-A-9-80206, JP-A-9-291227). However, this method of incorporating particles of metal oxide in the primer layer is problematic in that the impact resistance of the lenses is lowered, even though the refractive index of the layer can be increased.

SUMMARY OF THE INVENTION

In order to overcome many of the problems in the prior art, the invention provides a high-refractive-index thin film layer, which has good impact resistance, good adhesiveness between the substrate and the thin film layer, good scratch resistance and good antireflection capabilities.

The invention provides a coating composition for optical parts, and in particular, a thin film layer on the substrate surface. The thin film layer is preferably formed by curing the coating composition. Also provided is a method for producing optical parts, which comprises applying the coating liquid onto the surface of a synthetic resin substrate to form thereon a thin film layer.

In one aspect, the invention provides a coating composition for optical parts, which comprises:

(i) a dithian ring containing sulfur compound of the general formula (1):

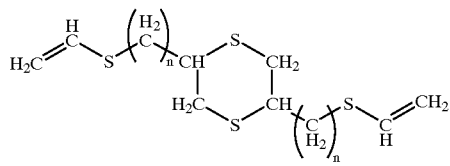

wherein n is an integer from 1 to 3, or a benzene ring containing sulfur compound of the general formula (2):

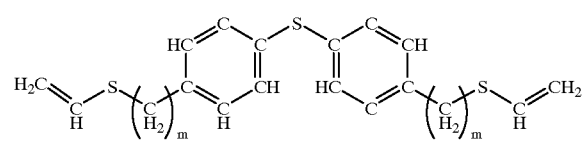

wherein m is 0 or 1, and (ii) a polyfunctional thiol.

In a preferred embodiment, the polyfunctional thiol is at least one thiol selected from the group consisting of 2,5-dimercaptomethyl-1,4-dithian and its oligomers, 1,2,3-trimercaptopropane, tetrakis(7-mercapto-2,5-dithiaheptyl)methane, pentaerythritol tetrakis(2-mercaptoacetate), 4,4'-thiodibenzenedithiol, bis(4-mercapto-2-thiobutylphenyl) sulfide and bis(7-mercapto-2,5-dithiaheptylphenyl) sulfide.

In another embodiment, the thin film layer can be applied to an optical part, and the optical part can further comprise a hard coat layer and an antireflection layer on the thin film layer. The hard coat layer can comprise particles of metal oxide and an organic silicon compound. The optical part can be an eyeglass lens.

Yet another aspect of the invention provides a method for producing optical parts, comprising the steps of:

(A) applying a coating liquid onto a surface of a plastic substrate, and (B) forming a thin film of said coating liquid, wherein said coating liquid comprises (i) a dithian ring containing sulfur compound of a general formula (1A):

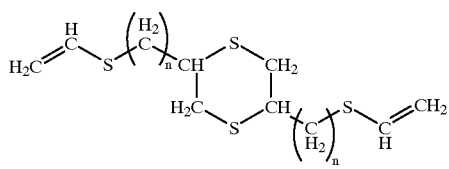

(1A)

wherein n is an integer from 1 to 3, or a benzene ring containing sulfur compound of the general formula (2A):

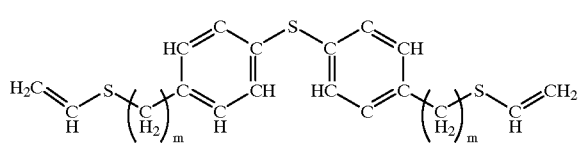

(2A)

wherein m is 0 or 1, and
(ii) a polyfunctional thiol.

The method can further comprise the steps of forming a hard coat layer and an antireflection layer on the thin film layer.

DETAILED DESCRIPTION OF THE INVENTION

We have found that when a thin film layer of a coating composition for optical parts comprises (1) a dithian ring containing sulfur compound and/or a benzene ring containing sulfur compound, and (2) a polyfunctional thiol compound formed on the surface of a plastic substrate, the resulting optical parts have good impact resistance and good adhesion between the substrate and the overlying layer. These good qualities remain even when a hard coat film and an antireflection film are further formed on the thin film layer.

The coating composition for optical parts comprises (1) a dithian ring containing sulfur compound and/or a benzene ring containing sulfur compound, and (2) a polyfunctional thiol compound. Preferred examples of the dithian ring containing sulfur compounds of formula (1) include 2,5-bis(2-thia-3-butenyl)-1,4-dithian (n=1 in formula (1)), 2,5-bis(3-thia-4-pentenyl)-1,4-dithian (n=2 in the same), 2,5-bis(4-thia-5-hexenyl)-1,4-dithian (n=3 in the same), etc.

Preferred examples of the benzene ring containing sulfur compounds of formula (2) include bis(4-vinylthiophenyl) sulfide (m=0 in formula (2)), bis(4-vinylthiomethylphenyl) sulfide (m=1 in the same), etc.

Preferred polyfunctional thiol compounds that can be used in the invention are 2,5-dimercaptomethyl-1,4-dithian (hereinafter referred to as DMMD), DMMD oligomers, 1,2,3-trimercaptopropane, tetrakis(7-mercapto-2,5-dithiaheptyl)methane, pentaerythritol tetrakis(2-mercaptoacetate), 4,4'-thiodibenzenedithiol, bis(4-mercapto-2-thiobutylphenyl) sulfide, bis(7-mercapto-2,5-dithiaheptylphenyl) sulfide, etc. These compounds can be used either singly or in combination.

In addition to those mentioned above, other polyfunctional thiols can be used. Included are aliphatic polythiols such as methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, 2,3-dimercapto-1-propanol (2-mercaptoacetate), 2,3-dimercapto-1-propanol (3-mercaptopropionate), diethylene glycol bis(2-mercaptoacetate), diethylene glycol bis(3-mercaptopropionate), 1,2-dimercaptopropyl methyl ether, 2,3-dimercaptopropyl methyl ether, 2,2-bis(mercaptomethyl)-1,3-propanedithiol, bis(2-mercaptoethyl) ether, ethylene glycol bis(2-mercaptoacetate), ethylene glycol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), etc.; and their halogen-substituted compounds such as chlorine-substituted compounds, bromine-substituted compounds, etc.; aromatic polythiols such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,4-tris(mercaptomethyleneoxy)benzene, 1,3,5-tris(mercaptomethyleneoxy)benzene, 1,2,3-tris(mercaptoethyleneoxy)benzene, 1,2,4-tris(mercaptoethyleneoxy)benzene, 1,3,5-tris(mercaptoethyleneoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptomethyleneoxy)benzene, 1,2,4,5-tetrakis(mercaptomethyleneoxy)benzene, 1,2,3,4-tetrakis(mercaptoethyleneoxy)benzene, 1,2,3,5-tetrakis(mercaptoethyleneoxy)benzene, 1,2,4,5-tetrakis(mercaptoethyleneoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di-(p-methoxyphenyl)propane-2,2-dithiol, 1,3-diphenylpropane-2,2-dithiol, phenylmethane-1,1-dithiol, 2,4-di(p-mercaptophenyl)pentane, etc.; aromatic polythiols such as 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)

benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene, etc.; aliphatic polythiols such as bis(mercaptomethyl) sulfide, bis(mercaptoethyl) sulfide, bis(mercaptopropyl) sulfide, bis(mercaptoethylthio)methane, bis(2-mercaptoethylthio)methane, bis(3-mercaptopropylthio)methane, 1,2-bis(mercaptomethylthio)ethane, 1,2-bis(mercaptoethylthio)ethane, 1,2-bis(mercaptopropylthio)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptoethylthio)propane, 2,5-dimercapto-1,4-dithian, 2,5-dimercaptomethyl-1,4-dithian, 2,6-dimercaptomethyl-1,4-dithian, bis(mercaptomethyl) disulfide, bis(mercaptoethyl) disulfide, bis(mercaptopropyl) disulfide, and their thioglycolates and mercaptopropionates, as well as hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,4-dithian-2,5-dithiol bis(2-mercaptoacetate), 1,4-dithian-2,5-dithiol bis(3-mercaptopropionate), bis(2-mercaptoethyl) thioglycolate, bis(2-mercaptoethyl) thiodipropionate, bis(2-mercaptoethyl) 4,4-thiodibutyrate, bis(2-mercaptoethyl) dithiodiglycolate, bis(2-mercaptoethyl) dithiodipropionate, bis(2-mercaptoethyl) 4,4-dithiodibutyrate, bis(2,3-dimercaptopropyl) thiodiglycolate, bis(2,3-dimercaptopropyl) thiodipropionate, bis(2,3-dimercaptopropyl) dithiodiglycolate, bis(2,3-dimercaptopropyl) dithiodipropionate, etc.

The ratio of the sulfur compound of formula (1) and/or the sulfur compound of formula (2) to the polyfunctional thiol to be in the composition is preferably from 4/1 to 1/1, more preferably from 3/2 to 1/1, in terms of the molar ratio of the functional groups, i.e., sulfur compound/polyfunctional thiol.

The coating composition of the invention may contain any components that may be used in ordinary coating compositions.

The thin film layer of the invention is preferably formed by curing the coating composition, and the cured layer is generally transparent. Heat, ultraviolet (UV) radiation or any curing agent may be used for curing the coating composition to form the thin film layer. The coating composition can be cured by heating in the presence of a thermal polymerization catalyst, which includes, for example, known azo compounds such as 2,2'-azobis-(2,4-dimethylvaleronitrile), 1,1'-azobis(cyclohexane-1,1-carbonitrile), 2,2'-azobis(4-methoxy-2,4-dimethyl-valeronitrile), 2,2'-azobisisobutyronitrile, 2-phenylazo-2,4-dimethyl-4-methoxyvaleronitrile, 2-cyano-2-propylazoformamide, 2,2'-azobis(2-amidinopropane) dihydrochloride, 2,2'-azobis(methyl isobutyrate), etc.; organic peroxides such as benzoyl peroxide, isobutyl peroxide, acetyl peroxide, etc. Curing it under UV radiation may be effected in the presence of a photo-polymerization catalyst, which includes, for example, known photo-catalysts such as benzophenone, p-chlorobenzophenone, o-methoxybenzophenone, acetophenone, o-methoxyacetophenone, 2,2-diethoxyacetophenone, benzaldehyde, dibenzosuberone, thioxanthone, benzanthrone, benzoin methyl ether, etc.

The amount of the catalyst to be used is not critical, but, depending on the components constituting the coating composition in general, it preferably falls between 0.01 and 5.0% by weight, more preferably between 0.1 and 2.0% by weight of the coating composition.

When the transparent thin film layer is formed by curing under heat, it is desirable that the coating composition for optical parts be applied to a lens, and then dried in hot air at a temperature between 70 and 150° C., preferably between 90 and 120° C. If the temperature is lower than 70° C., the transparent thin film layer will be insufficiently cured. On the other hand, if the temperature is higher than 150° C., the substrate and the transparent thin film layer will become yellowed. The curing time can be generally between 15 and 120 minutes, preferably between 30 and 60 minutes. When the layer is formed by curing with UV rays, it is desirable that the UV radiation is applied for 1 to 120 seconds, preferably for 15 to 60 seconds. If UV radiation time is shorter than one second, the transparent thin film layer will be insufficiently cured; but if cured longer than 120 seconds, plastic lenses will become yellowed.

The coating composition may be diluted with a solvent. Any known solvent can be used, but preferred compounds are methyl ethyl ketone, ethyl acetate, xylene, toluene, benzene, chloroform, chlorobenzene, and o-dichlorobenzene. These may be used either singly or in combination as a mixed solvent. A leveling agent may be added to the coating composition for the propose of improving coatability of the composition.

To apply the coating composition onto a substrate surface, any known method of dipping, spin-coating, spraying, etc. may be employed. Preferred methods are dipping and spin-coating. Prior to applying the coating composition onto a substrate, the substrate may be chemically processed with acids, alkalis or various organic solvents, or physically processed with plasma, UV rays, etc., or may be washed with various detergents.

It is desirable that the thin film layer of the invention have a refractive index of not less than 1.60, more preferably falling between 1.60 and 1.75. If the refractive index is lower than 1.60, the thin film layer formed on a high-refractive-index substrate will produce an interference fringe that degrades the appearance of the coated substrate. The refractive index is preferably that of a film composition having a thickness of 0.5 mm as measured with an Abbé's refractometer.

The thin film layer preferably has a thickness of from 0.1 to 20 $\mu$m, more preferably from 0.5 to 10 $\mu$m. If the thickness is less than 0.1 $\mu$m, the layer will not provide significant impact resistance to the coated substrate. If the thickness is greater than 20 $\mu$m, a hard coat layer provided on the thin film layer can be more easily become cracked.

The optical parts of the invention comprise the thin film layer on a plastic substrate and, preferably, a hard coat layer and an antireflection layer on the thin film layer. The hard coat layer preferably comprises fine metal oxide grains and an organic silicon compound of, for example, the general formula (3):

$$(R^1)_a(R^2)_b Si(OR^3)_{4-(a+b)} \quad (3)$$

wherein $R^1$ and $R^2$ each independently represent an alkyl group, an alkenyl group, an aryl group, an acyl group, a halogen atom, a glycidoxy group, an epoxy group, an amino group, a phenyl group, a mercapto group, a methacryloxy group or a cyano group; $R^3$ represents an alkyl group having from 1 to 8 carbon atoms, an alkoxy group, an acyl group or a phenyl group; and a and b each independently represent 0 or 1.

As fine grain metal oxide colloidal particles, metal oxides can be used. For example, tungsten oxide ($WO_3$), zinc oxide (ZnO), silicon oxide ($SiO_2$), aluminum oxide ($Al_2O_3$), titanium oxide ($TiO_2$), zirconium oxide ($ZrO_2$), tin oxide ($SnO_2$), beryllium oxide (BeO), antimony oxide ($Sb_2O_5$) or the like can be used. These may be used either singly or in combination.

The organic silicon compound of formula (3) is preferably: Methyl silicate, ethyl silicate, n-propyl silicate, isopropyl silicate, n-butyl silicate, sec-butyl silicate, tert-butyl silicate, tetraacetoxysilane, methyltrimethoxysilane, methyltriethoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenethyloxysilane, glycidoxymethyltrimethoxysilane, glycidoxymethyltriethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysialne, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(δ3,4-epoxycyclohexyl)butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, γ-glycidoxypropylphenyldimethoxysilane, γ-glycidoxypropylphenyldiethoxysilane, ethyltrimethoxysilane, ethyltriethoxysilane, vinyltrimethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γchloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl)-γ-aminopropyltrimethoxysilane, N-(β-aminoethyl)-γ-aminopropylmethyldimethoxysilane, γ-aminopropylmethyldimethoxysilane, N-(β-aminoethyl)-γ-aminopropyltriethoxysilane, N-(β-aminoethyl)-γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, methylvinyldimethoxysilane, methylvinyldiethoxysilane, etc.

The antireflection layer which can be formed over the hard coat layer is not critical, and any known inorganic oxides may be used. The layer may be of a single-layered or multi-layered film.

The substrate for the optical parts of the invention may be any plastic substrate. For example, copolymers of methyl methacrylate and one or more other monomers, copolymers of diethylene glycol bisallyl carbonate and one or more other monomers, polycarbonates, polystyrenes polyvinyl chlorides, unsaturated polyesters, polyethylene terephthalates, polyurethanes polythiourethanes, sulfide resins formed through ene-thiol reaction, sulfur-containing vinyl polymers, etc. However, the plastic substrates are not limited to those listed above.

The optical parts of the invention have many applications in various fields, and are especially useful as eyeglass lenses.

The invention is further described by the Examples. However, these Examples are not intended to restrict the scope of the invention.

EXAMPLES

The physical properties of the products produced in the Comparative Examples were measured according to the methods mentioned below.

(1) Scratch Resistance Test:

The plastic lenses produced in the Examples and Comparative Examples are rubbed with steel wool #0000, and visually checked for scratch resistance. The criteria are as follows:

A: Slightly scratched, when rubbed strongly.

B: More noticably scratched, when rubbed strongly.

C: Scratched to the same degree as the non-coated plastic substrate.

(2) Measurement of Refractive Index of Thin Film Layer:

A film sample having a thickness of 0.5 mm is prepared. Refractive index is measured at 20° C. with a precision Abbe's refractometer manufactured by Atago Co.

(3) Adhesion Test:

The surface of each plastic lens is cross-cut at intervals of 1 mm to form 100 cross-cuts thereon. An adhesive tape (Cellotape, trade name, from Nichiban Co.) is adhered on the cross-cut surface under strong pressure, and is then rapidly peeled off. The surface is checked as to whether or not the cross-cuts are peeled off along with the tape. Samples with no cross-cuts peeled are represented by 100/100; and those with all cross-cuts peeled are by 0/100. [It may be difficult for someone in the U.S. to do the "adhesion test" if he cannot obtain the "Cellotape, trade name, from Nichiban Co." Therefore, please provide some technical specification on this "Cellotape."]

(4) Presence or Absence of Interference Fringe:

Each plastic lens is exposed to white light from a daylight fluorescent lamp, and visually checked for appearance. The criteria are as follows:

A: Interference fringes somewhat noticeable.

B: Interference fringes noticeable.

C: Interference fringes highly noticeable.

(5) Impact Resistance Test:

Each lens is subjected to a ball dropping test. A ball, weighing 25 g is spontaneously dropped onto the center of each lens at a height of 127 cm. Lenses not broken in the test are judged good, and those broken or slightly cracked are judged not good.

○: Good.

X: Not good.

(6) Outward Appearance:

Each lens is visually checked for its outward appearance under a fluorescent lamp in a dark room.

Example 1

Preparation of Coating Liquid for Transparent Thin Film Layer:

252 parts by weight of tetrakis(7-mercapto-2,5-dithiaheptyl)methane (thiol component) was put into a glass reactor equipped with a magnetic stirrer. While stirring, 196 parts by weight of 2,5-bis(2-thia-3-butenyl)-1,4-dithian was added dropwise thereto. One part by weight of a photo-initiator, 2,2-diethoxyacetophenone, and, as solvents, 890 parts by weight of toluene and 890 parts by weight of methyl ethyl ketone were added thereto. The mix was stirred well, until the resulting solution became uniform. The solution was then filtered to obtain a coating liquid for a transparent thin film layer.

Preparation of Hard Coat Liquid:

246 parts by weight of fine inorganic grains of composite sol consisting essentially of titanium oxide and zirconium oxide (dispersed in methanol to have a solid content of 30%) was put into a glass reactor equipped with a magnetic stirrer, and 73.8 parts by weight of an organic silicon compound, γ-glycidoxypropyltrimethoxysilane (from Shin-etsu Chemical Industry) was added dropwise thereto while stirring. After the addition, 20 parts by weight of 1 N HCl, 410 parts by weight of a solvent, ethyl cellosolve, 0.1 parts by weight of a siliconesurfactant, and 3 parts by weight of a curing promoter, aluminum acetylacetonate were added thereto, and fully stirred. The resulting mixture was filtered to obtain a hard coat composition.

Coating and Curing of Transparent Thin Film Layer:

A lens having a refractive index of 1.71 (TESLALID, trade name, from Hoya Corp., having a thickness of 1.1 mm at the center) was dipped in an aqueous solution of 10% NaOH at 45° C. for 5 minutes. After the lens was dried, it was coated with the coating liquid by dipping at a pulling rate of 10 cm/min. Then the lens was exposed to UV rays for 30 seconds thereby forming thereon a transparent thin film layer.

Coating and Curing of Hard Coat Layer:

The lens coated with the transparent thin film layer was washed with isopropyl alcohol (IPA) for 5 minutes. After the lens was dried, it was coated with the hard coat liquid, prepared previously, by a dipping at a pulling rate of 20 cm/min. Then the lens was cured under heat at 110° C. for 60 minutes.

Formation of Antireflection Layer:

The coated plastic lens was further coated with an antireflection layer in the manner mentioned below. The coated plastic lens was set in a vapor deposition chamber, and heated therein at 85° C. while the chamber was degassed. After the vacuum conditions in the chamber reached $2 \times 10^{-5}$ Torr, an antireflection layer having a laminate structure ($\lambda/4$–$\lambda/2$–$\lambda/4$) of $SiO_2$ and $ZrO_2$ was vapor deposited onto the lens by heating with an electron beam. The physical properties of the coated plastic lens are shown in Table 1.

Example 2

The same process as in Example 1 was repeated, except that the thiol component in the coating liquid for the transparent thin film layer comprised 122 parts by weight of tetrakis(7-mercapto-2,5-dithiaheptyl)methane and 111 parts by weight of 4,4'-thiodibenzenedithiol and that the amount of 2,5-bis(2-thia-3-butenyl)-1,4-dithian therein was 215 parts by weight. The physical properties of the coated plastic lens are shown in Table 1.

Example 3

The same process as in Example 1 was repeated, except that the thiol component in the coating liquid for the transparent thin film layer comprised 92 parts by weight of tetrakis(7-mercapto-2,5-dithiaheptyl)methane and 74 parts by weight of 1,2,3-trimercaptopropane and that the amount of 2,5-bis(2-thia-3-butenyl)-1,4-dithian therein was 281 parts by weight. The physical properties of the coated plastic lens are shown in Table 1.

Example 4

The same process as in Example 1 was repeated, except that 118 parts by weight of 1,2,3-trimercaptopropane was used as the thiol component in the coating liquid for the transparent thin film layer and that the amount of 2,5-bis(2-thia-3-butenyl)-1,4-dithian therein was 330 parts by weight. The physical properties of the coated plastic lens are shown in Table 1.

Example 5

The same process as in Example 1 was repeated, except that the thiol component in the coating liquid for the transparent thin film layer comprised 114 parts by weight of tetrakis(7-mercapto-2,5-dithiaheptyl)methane and 154 parts by weight of an oligomer of 2,5-dimercaptomethyl-1,4-dithian (DMMD) and that the amount of 2,5-bis(2-thia-3-butenyl)-1,4-dithian therein was 180 parts by weight. The physical properties of the coated plastic lens are shown in Table 1.

Example 6

Preparation of Coating Liquid for Transparent Thin Film Layer:

252 parts by weight of tetrakis(7-mercapto-2,5-dithiaheptyl)methane was put into a glass reactor equipped with a magnetic stirrer. While stirring, 196 parts by weight of 2,5-bis(2-thia-3-butenyl)-1,4-dithian was added dropwise thereto. One part by weight of a thermal polymerization initiator, 2,2-azobis-(2,4-dimethylvaleronitrile), and, as solvents, 890 parts by weight of toluene and 890 parts by weight of methyl ethyl ketone were added thereto, and stirred well until the resulting solution became uniform. The solution was filtered to obtain a coating liquid for a transparent thin film layer.

Coating and Curing of Transparent Thin Film Layer:

A lens having a refractive index of 1.71 (TESLALID, trade name, from Hoya Corp., having a thickness of 1.1 mm at the center) was dipped in an aqueous solution of 10% NaOH at 45° C. for 5 minutes. After the lens was dried, it was coated with the coating liquid, as prepared previously, by dipping at a pulling rate of 10 cm/min. Then the lens was cured by heating at 110° C. for 30 minutes, thereby forming thereon a transparent thin film layer.

Except for the steps mentioned above, the lens was processed in the same manner as in Example 1 to coat it with a hard coat layer and an antireflection layer. The physical properties of the coated plastic lens are shown in Table 1.

Example 7

Preparation of Coating Liquid for Transparent Thin Film Layer:

246 parts by weight of 2,5-bis(2-thia-3-butenyl)-1,4-dithian was put into a glass reactor equipped with a magnetic stirrer. While stirring, 202 parts by weight of pentaerythritol tetrakis(2-mercaptoacetate) was added dropwise thereto. Two parts by weight of a photo-initiator, 2,2-diethoxyacetophenone, and, as solvents, 890 parts by weight of toluene and 890 parts by weight of methyl ethyl ketone were added thereto, and stirred well until the resulting solution became uniform. Then, this solution was filtered to obtain a coating liquid for a transparent thin film layer.

In place of the lens having a refractive index of 1.71 used in Example 1, a lens having a refractive index of 1.60 (EYAS, trade name, from Hoya, having a thickness of 1.1 mm at the center) was processed in the same manner as in Example 1, except that the coating liquid prepared herein as above was used. The physical properties of the coated plastic lens are shown in Table 1.

Example 8

Preparation of Coating Liquid for Transparent Thin Film Layer:

350 parts by weight of bis(4-vinylthiomethylphenyl) sulfide was put into a glass reactor equipped with a magnetic stirrer. While stirring, 99 parts by weight of 1,2,3-trimercaptopropane was added dropwise thereto. Two parts by weight of a photo-initiator, 2,2-diethoxyacetophenone, and, as solvents, 890 parts by weight of toluene and 890 parts by weight of methyl ethyl ketone were added thereto, and stirred well until the resulting solution became uniform. Then, this solution was filtered to obtain a coating liquid for a transparent thin film layer.

The same lens as in Example 1 was processed in the same manner as in Example 1, except that the coating liquid prepared herein as above was used. The physical properties of the coated plastic lens are shown in Table 1.

Example 9

Preparation of Coating Liquid for Transparent Thin Film Layer:

187 parts by weight of bis(4-vinylthiomethylphenyl) sulfide and 151 parts by weight of 2,5-bis(2-thia-3-butenyl)-1,4-dithian were put into a glass reactor equipped with a magnetic stirrer. While stirring, 107 parts by weight of 1,2,3-trimercaptopropane was added dropwise thereto. Two parts by weight of a photoinitiator, 2,2-diethoxyacetophenone, and, as solvents, 890 parts by weight of toluene and 890 parts by weight of methyl ethyl ketone were added thereto, and stirred well until the resulting solution became uniform. Then, this solution was filtered to obtain a coating liquid for a transparent thin film layer.

The same lens as in Example 1 was processed in the same manner as in Example 1, except that the coating liquid prepared herein as above was used. The physical properties of the coated plastic lens are shown in Table 1.

Comparative Example 1

The same process as in Example I was repeated, except that the transparent thin film layer was not provided on the lens. The physical properties of the coated plastic lens are shown in Table 1.

Comparative Example 2

The same process as in Example 6 was repeated, except that the transparent thin film layer was not provided on the lens. The physical properties of the coated plastic lens are shown in Table 1.

Comparative Example 3

The same process as in Example 7 was repeated, except that the transparent thin film layer was not provided on the lens. The physical properties of the coated plastic lens are shown in Table 1.

Comparative Example 4

A coating liquid for a transparent thin film layer was prepared from 129 parts by weight of a commercially-available polyester-polyol, "Desmophen 670" (from Sumitomo Bayer Urethane), 121 parts by weight of a commercially-available blocked polyisocyanate, "BL-3175" (from Sumitomo Bayer Urethane), 2.2 parts by weight of a curing promoter, dibutyltin dilaurate, and 1940 parts by weight of a solvent, methyl ethyl ketone. This was applied onto the same lens as in Example 1, according to the same dipping method as therein, and then cured by heating at 120° C. for 30 minutes. Except for this step, the lens was processed in the same manner as in Example 1. The physical properties of the coated plastic lens are shown in Table 1.

TABLE 1

| | Scratch Resistance | Refractive Index of Transparent Thin Film Layer | Adhesiveness | Presence or Absence of Interference Fringe | Impact Resistance | Outward Appearance |
|---|---|---|---|---|---|---|
| Example 1 | A | 1.670 | 100/100 | A | ○ | good |
| Example 2 | A | 1.705 | 100/100 | A | ○ | good |
| Example 3 | A | 1.681 | 100/100 | A | ○ | good |
| Example 4 | A | 1.686 | 100/100 | A | ○ | good |
| Example 5 | A | 1.680 | 100/100 | A | ○ | good |
| Example 6 | A | 1.670 | 100/100 | A | ○ | good |
| Example 7 | A | 1.637 | 100/100 | A | ○ | good |
| Example 8 | A | 1.702 | 100/100 | A | ○ | good |
| Example 9 | A | 1.691 | 100/100 | A | ○ | good |
| Comparative Example 1 | A | — | 100/100 | A | X | good |
| Comparative Example 2 | A | — | 100/100 | A | X | good |
| Comparative Example 3 | A | — | 100/100 | A | X | good |
| Comparative Example 4 | A | 1.520 | 100/100 | C | ○ | good |

The present invention provides a thin film layer having a specific composition and having a refractive index of not less than 1.60 on the surface of a substrate. The invention provides optical parts having good impact resistance, good adhesiveness between the substrate and the thin film layer, good scratch resistance and good antireflection capabilities, even when a hard coat film and an antireflection film are further provided on the thin film layer.

The descriptions presented herein enable a person of ordinary skill in the art to make and use the invention. Although the present invention has been fully described by way of examples with reference to the accompanying drawings, it is to be noted that various modifications will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

What is claimed is:

1. An optical part, comprising:
   (a) a thin film layer formed by curing a coating composition, comprising:
      (i) a dithian ring containing sulfur compound of a general formula (1):

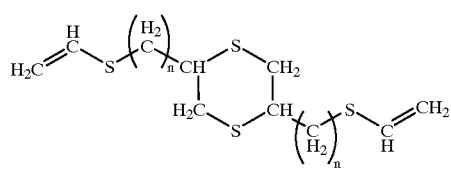

(1)

wherein n is an integer from 1 to 3, or a benzene ring containing sulfur compound of a general formula (2):

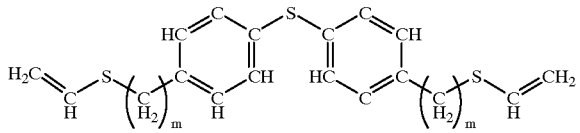

(2)

wherein m is 0 or 1, and
   (ii) a polyfunctional thiol,
   wherein the thin film layer has a thickness of 0.1 to 20 microns, and
   (b) a hard coat layer on the thin film layer.

2. The optical part of claim 1, wherein the polyfunctional thiol is at least one thiol selected from the group consisting of 2,5dimercaptomethyl-1,4-dithian and its oligomers, 1,2,3-trimercaptopropane, tetrakis(7-mercapto-2,5-dithiaheptyl)methane, pentaerythritol tetrakis(2-mercaptoacetate), 4,4'-thiodibenzenedithiol, bis(4-mercapto-2-thiobutylphenyl) sulfide and bis(7-mercapto-2,5-dithiaheptylphenyl) sulfide.

3. The optical part of claim 1, wherein the hard coat layer comprises particles of metal oxide and an organic silicon compound.

4. A method for producing optical parts, comprising:
   (A) applying a coating liquid onto a surface of a plastic substrate,
   (B) forming a thin film having a thickness of 0.1 to 20 microns by curing said coating liquid, wherein said coating liquid comprises
      (i) a dithian ring containing sulfur compound of a general formula (b 1A):

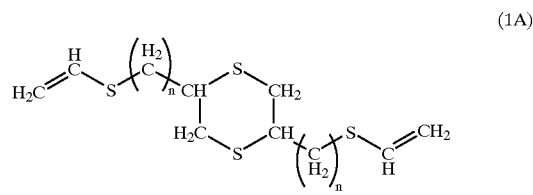

(1A)

wherein n is an integer from 1 to 3, or a benzene ring containing sulfur compound of a general formula (2):

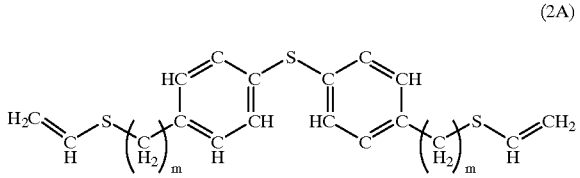

(2A)

wherein m is 0 or 1, and
      (ii) a polyfunctional thiol, and
   (C) forming a hard coat layer on the thin film layer.

5. The optical part of claim 1, further comprising an antireflection layer on the hard coat layer.

6. The optical part of claim 1, wherein the optical part is an eyeglass lens.

7. The optical part of claim 2, wherein the optical part is an eyeglass lens.

8. The optical part of claim 5, wherein the optical part is an eyeglass lens.

9. The optical part of claim 1, wherein the hard coat layer comprises fine metal oxide grains and an organic silicon compound of the general formula (3):

$$(R^1)_a(R^2)_b Si(OR^3)_{4-(a+b)} \qquad (3)$$

wherein $R^1$ and $R^2$ each independently represent an alkyl group, an alkenyl group, an aryl group, an acyl group, a halogen atom, a glycidoxy group, an epoxy group, an amino group, a phenyl group, a mercapto group, a methacryloxy group or a cyano group; $R^3$ represents an alkyl group having from 1 to 8 carbon atoms, an alkoxy group, an acyl group or a phenyl group; and a and b each independently represent 0 to 1.

10. The optical part of claim 1, wherein the hard coat layer consists essentially of titanium oxide, zirconium oxide and γ-glycidoxypropyltrimethoxysilane.

11. The method for producing optical parts of claim 4, further comprising applying an antireflection layer on the hard coat layer.

12. The method for producing optical parts of claim 4, wherein the hard coat layer comprises fine metal oxide grains and an organic silicon compound of the general formula (3):

$$(R^1)_a(R^2)_b Si(OR^3)_{4-(a+b)} \qquad (3)$$

wherein $R^1$ and $R^2$ each independently represent an alkyl group, an alkenyl group, an aryl group, an acyl group, a halogen atom, a glycidoxy group, an epoxy group, an amino group, a phenyl group, a mercapto group, a methacryloxy group or a cyano group $R^3$ represents an alkyl group having from 1 to 8 carbon atoms, an alkoxy group, an acyl group or a phenyl group; and a and b each independently represent 0 or 1.

13. The method for producing optical parts of claim 4, wherein the hard coat layer consists essentially of titanium oxide, zirconium oxide and γ-glycidoxypropytrimethoxysilane.

* * * * *